US006868966B2

(12) United States Patent
German, III

(10) Patent No.: US 6,868,966 B2
(45) Date of Patent: Mar. 22, 2005

(54) SELF-STANDING SAW BLADE PACKAGE

(75) Inventor: George J. German, III, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/208,682

(22) Filed: Jul. 30, 2002

(65) Prior Publication Data

US 2004/0020806 A1 Feb. 5, 2004

(51) Int. Cl.[7] .............................................. A45C 11/26
(52) U.S. Cl. ...................... 206/349; 206/303; 206/493; 206/467
(58) Field of Search ................................ 206/349, 303, 206/308.1, 493, 461–471, 776, 782; 220/4.21, 4.24, 4.25

(56) References Cited

U.S. PATENT DOCUMENTS

| | | | | |
|---|---|---|---|---|
| 3,259,231 A | * | 7/1966 | Romanowski et al. ...... | 206/349 |
| 4,588,082 A | | 5/1986 | Ridings | |
| 4,623,062 A | * | 11/1986 | Chase et al. ................. | 206/311 |
| 4,634,559 A | * | 1/1987 | Eckert .......................... | 261/76 |
| 4,749,082 A | * | 6/1988 | Gardiner et al. ............. | 206/349 |
| 4,770,293 A | * | 9/1988 | Craig .......................... | 206/564 |
| 4,819,798 A | | 4/1989 | Hasuike | |
| 4,895,252 A | * | 1/1990 | Nomula et al. ........... | 206/308.1 |
| 4,993,770 A | | 2/1991 | Groves | |
| 5,322,162 A | | 6/1994 | Melk | |
| 5,476,173 A | | 12/1995 | Opresco | |
| 5,485,919 A | * | 1/1996 | Samberg et al. ............. | 206/461 |
| 5,611,426 A | * | 3/1997 | Warfield ................... | 206/308.1 |
| 5,653,335 A | * | 8/1997 | Bauer et al. .............. | 206/307.1 |
| 5,685,426 A | * | 11/1997 | Marshall ...................... | 206/320 |
| 5,713,463 A | * | 2/1998 | Lakoski et al. ........... | 206/308.1 |
| 5,743,390 A | | 4/1998 | Pozzoli | |
| 6,427,832 B1 | * | 8/2002 | Ali et al. ..................... | 206/303 |

* cited by examiner

Primary Examiner—Shian T. Luong
(74) Attorney, Agent, or Firm—Harness, Dickey & Pierce, P.L.C.

(57) ABSTRACT

A self-standing saw blade package includes a first and second panel. The first panel includes at least two circular portions for receiving saw blades. The circular portions overlap one another such that the length of the at least two circular portions is less than the length of the combined diameters of the circular portions. The two circular portions are offset with respect to one another such that a portion of the saw blades in the circular portion contact one another. Securement members on the first and second panels mate with one another to hold the panels together such that the saw blades are sandwiched between the panels. At least one foot is coupled with the panels to enable the panels to stand with respect to a surface.

11 Claims, 7 Drawing Sheets

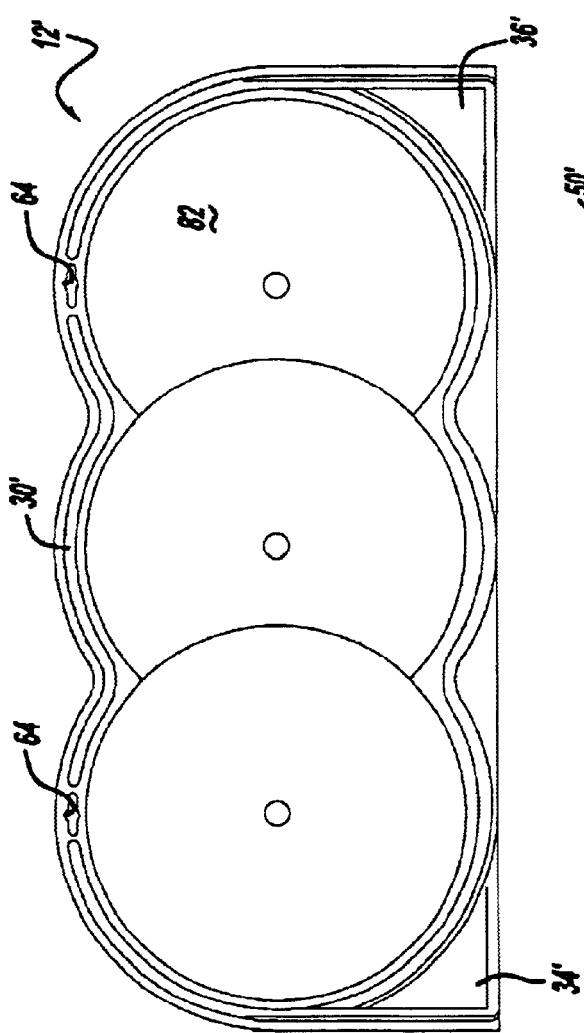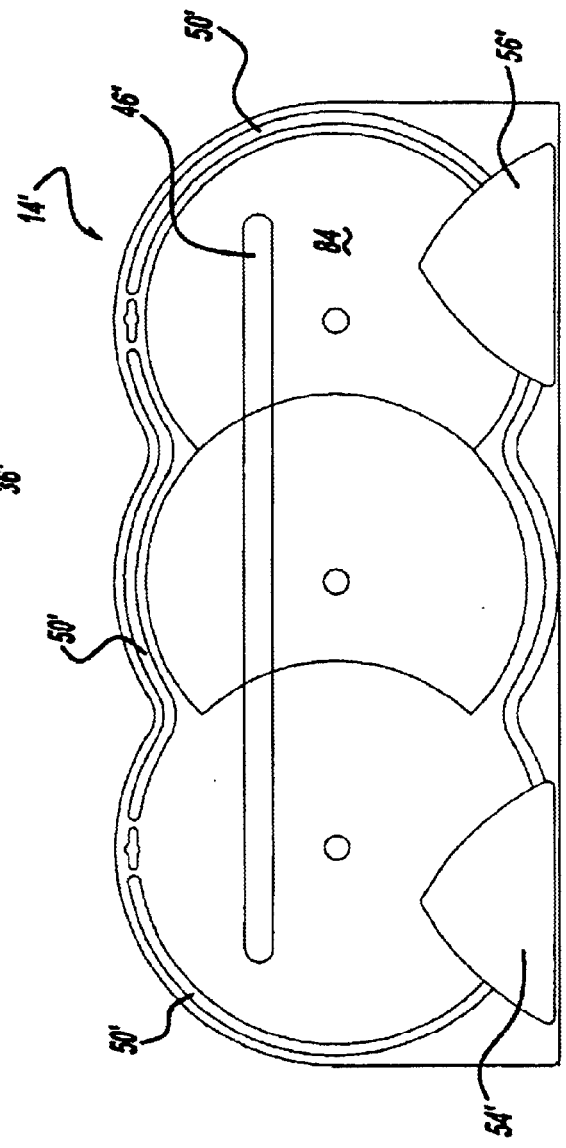

SELF-STANDING SAW BLADE PACKAGE

FIELD AND BACKGROUND OF THE INVENTION

The present invention relates to packaging and, more particularly, to self-standing packaging for saw blades.

In order for merchants to sell items, particularly saw blades, they must be displayed for purchase by consumers. Ordinarily, saw blades, due to their disc shape, are displayed by having pegs project through their arbor hole. Other methods are used to display saw blades such as stacking the saw blades one against another in a box. Further, saw blades are packaged on flat board material with a peg receiving opening at the top of the board. While these packaging modes are satisfactory to display saw blades, designers strive to provide better packaging to enhance sales of saw blades.

SUMMARY OF THE INVENTION

The present invention provides the art with a saw blade package that is self standing. The saw blade package enables saw blades to sit perpendicular to a shelf and be viewed by the consumer. The present invention provides packaging which nests together to provide stackability.

In accordance with a first aspect of the invention, a package for a saw blade comprises a first panel and second panel. The first panel includes at least two circular portions to receive saw blades. The circular portions overlap one another such that the length of the at least two circular portions is less than the length of the combined diameters of the at least two circular portions. The at least two circular portions are offset with respect to one another such that the saw blades, once placed in the circular portions, overlap and contact one another. A first securement member is on the first panel. The second panel includes a second securement member coupled with the first securement member to hold the panels together. The saw blades are sandwiched between the two panels. At least one foot is coupled with the panels. The foot enables the panels to stand with respect to a horizontal surface. Preferably, a pair of feet are coupled with the panels. Each foot is unitarily formed with the panels. The second panel includes a pair of arbor members to receive an arbor hole of the saw blade. The securement members have an arcuate shape and are peripherically spaced with respect to the saw receiving portions. Also the second panel includes a circular portion to provide a base for the offset saw blade. The panels are made of a transparent material. The securement members are adhered to one another. The second panel includes at least one stiffening rib.

From the following detailed description taken in conjunction with the drawings and subjoined claims, other objects and advantages will become apparent to those skilled in the art.

BRIEF DESCRIPTION OF THE DRAWINGS

FIG. 8 is an inside view of a front panel, like FIG. 3, of an additional embodiment in accordance with the present invention.

FIG. 9 is an inside perspective view of the back panel, like FIG. 4, of the additional embodiment.

DETAILED DESCRIPTION OF THE PREFERRED EMBODIMENTS

Figure 1:
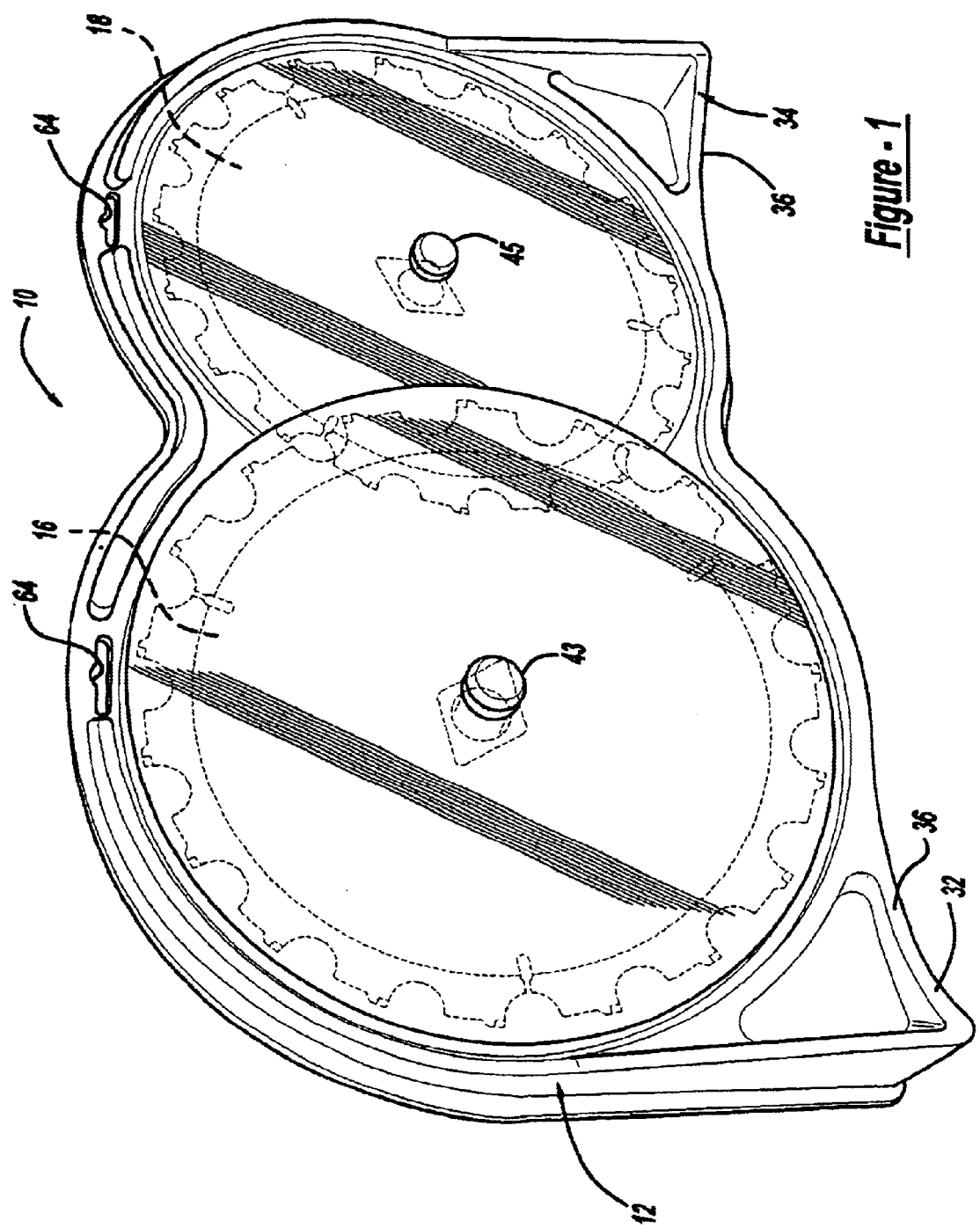
FIG. 1 is a front perspective view of a package in accordance with the present invention.
Figure 2:
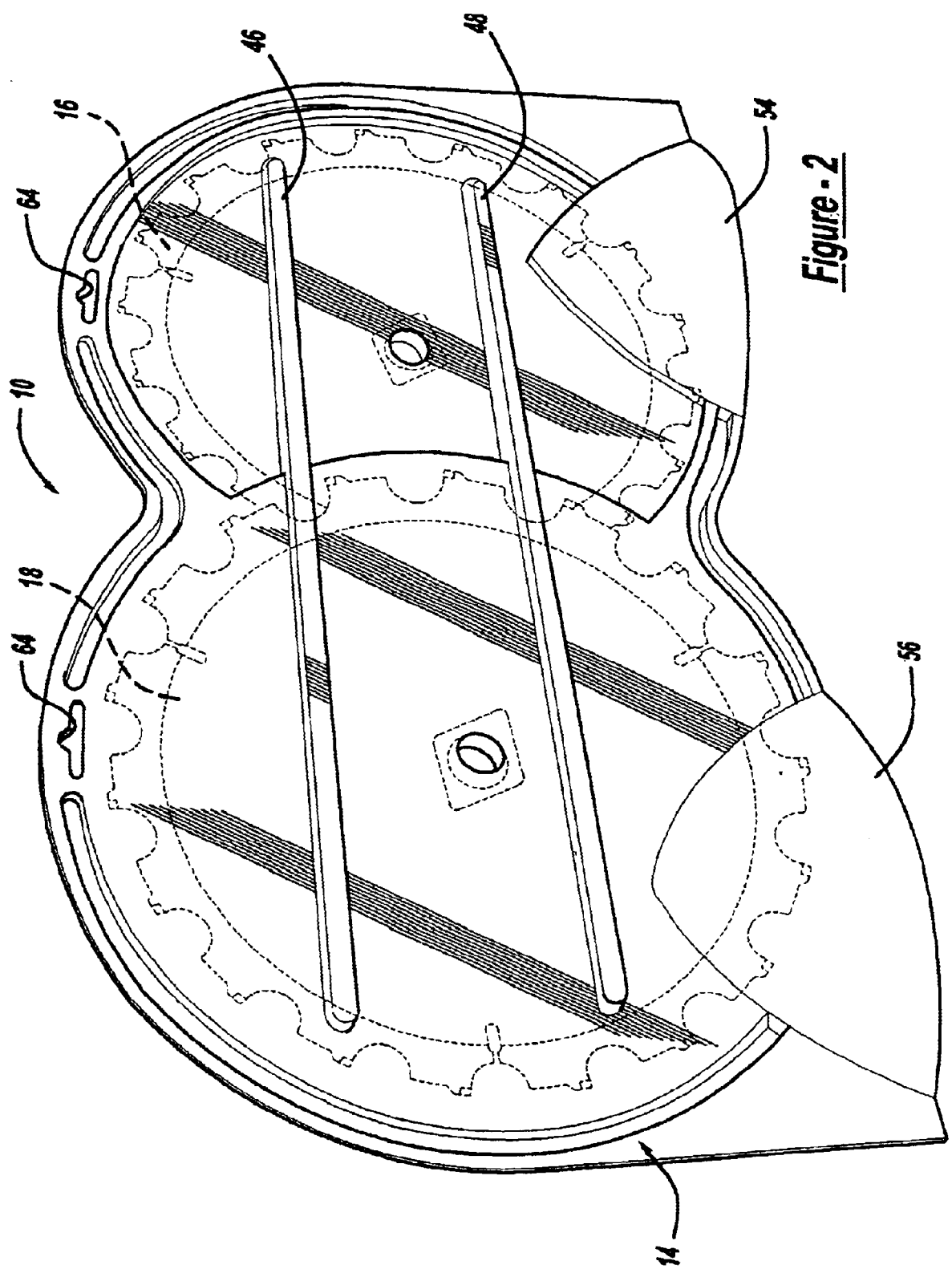
FIG. 2 is a rear perspective view of the package of FIG. 1.

Turning to the Figures, particularly FIGS. 1 and 2, a saw blade package in accordance with the present invention is illustrated and designated with the reference numeral 10. The package 10 includes a front panel 12 and a back panel 14. Saw blades 16 and 18 are sandwiched between the panels 12 and 14.

The front panel 12 includes a first and second saw blade receiving portion 20 and 22. The saw blade receiving portion 20 includes a circular peripheral rim 24. The rim maintains the saw blade 16 within the receiving portion 20. The second saw blade receiving portion 22 includes a rim 26 which maintains the saw blade 18 within the receiving portion 22. The receiving portion 20 is offset with respect to the receiving portion 22 such that they are spaced with respect to one another from front to back. Thus, this enables a portion of saw blades 16 and 18 to overlap one another. Also, the length L of the two saw blade receiving portions 20 and 22 is less than the length of the combined diameters of the saw blades. Thus, this further provides the overlapping effect. Also, the receiving portions 20, 22 have a depth such that the blades contact one another when positioned in the receiving portions 20 and 22.

Figure 3:
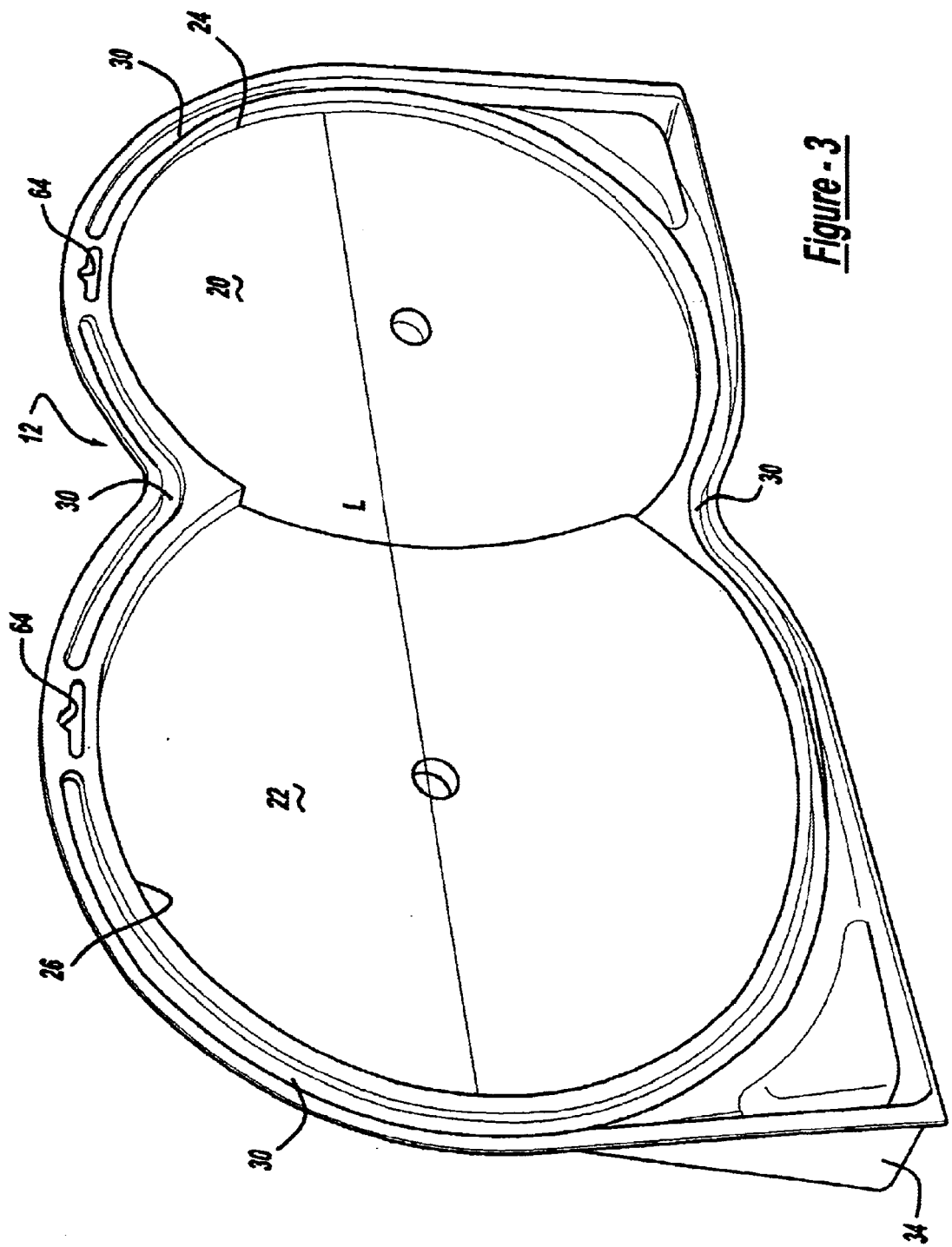
FIG. 3 is an inside perspective view of the front panel.

The front panel 12 also includes arcuate securement members 30. The arcuate securement members 30 are positioned about the periphery of the panel and peripherally with respect to the saw blade receiving portions 20 and 22 as seen in FIG. 3.

The front panel 12 includes two extending leg portions 32 and 34. The leg portions 32, 34 extend from the bottom corners of the front panel 12. The legs 32 and 34 includes an arcuate surface 36 which enables nesting of an adjacent package, one next to the other, to provide compactness for maximum shelf space.

The back panel 14 has an overall shape similar to that of the front panel 12. The back panel 14 includes a mating saw receiving portion 38 which projects into the saw retention portion 20. Saw receiving portion 38 acts as a base to position saw blade 18 within the saw receiving portion 22. The rim 40 is adjacent to the rim 24 sandwiching the saw blade 18 between the portions 22, 38 and providing a tight fit so that the overlapping configurations is accomplished.

The back panel 14 includes arbor hole retention member 42 and 44 which receive saw blades 16 and 18. The first panel 12 includes mating members 43, 45 to couple with the arbor hole retention members 42 and 44. Also back panel 14 includes reinforcement ribs 46 and 48. The reinforcement ribs 46 and 48 provide rigidity to the back panel 14. Securement members 50 are provided about the periphery of the back panel 14. The securement members 50 mate with corresponding securement members 30 of the front panel 12 to hold the panels together with one another. Also, the securement members 30, 50 ordinarily include an adhesive or are melted to bond with one another.

Projecting feet 54 and 56 extend from the rear of the back panel 14. The feet 54 and 56 have an triangular arcuate shape enhancing the ability of the package to stand by itself. The feet 54 and 56 are molded with the back panel 14.

The package 10 is of a blister pack type being formed of a PVC material. The blister pack 10 includes openings 64 which enable the packaging to be hung on pegs for display. The panels 12 and 14 are transparent which enables viewing of the saw blades inside of the panels 12 and 14. Thus, the package 10 can stand by itself on a shelf such that the saw blades are perpendicular to the surface or they may be hung onto pegs on a display board.

Figure 4:
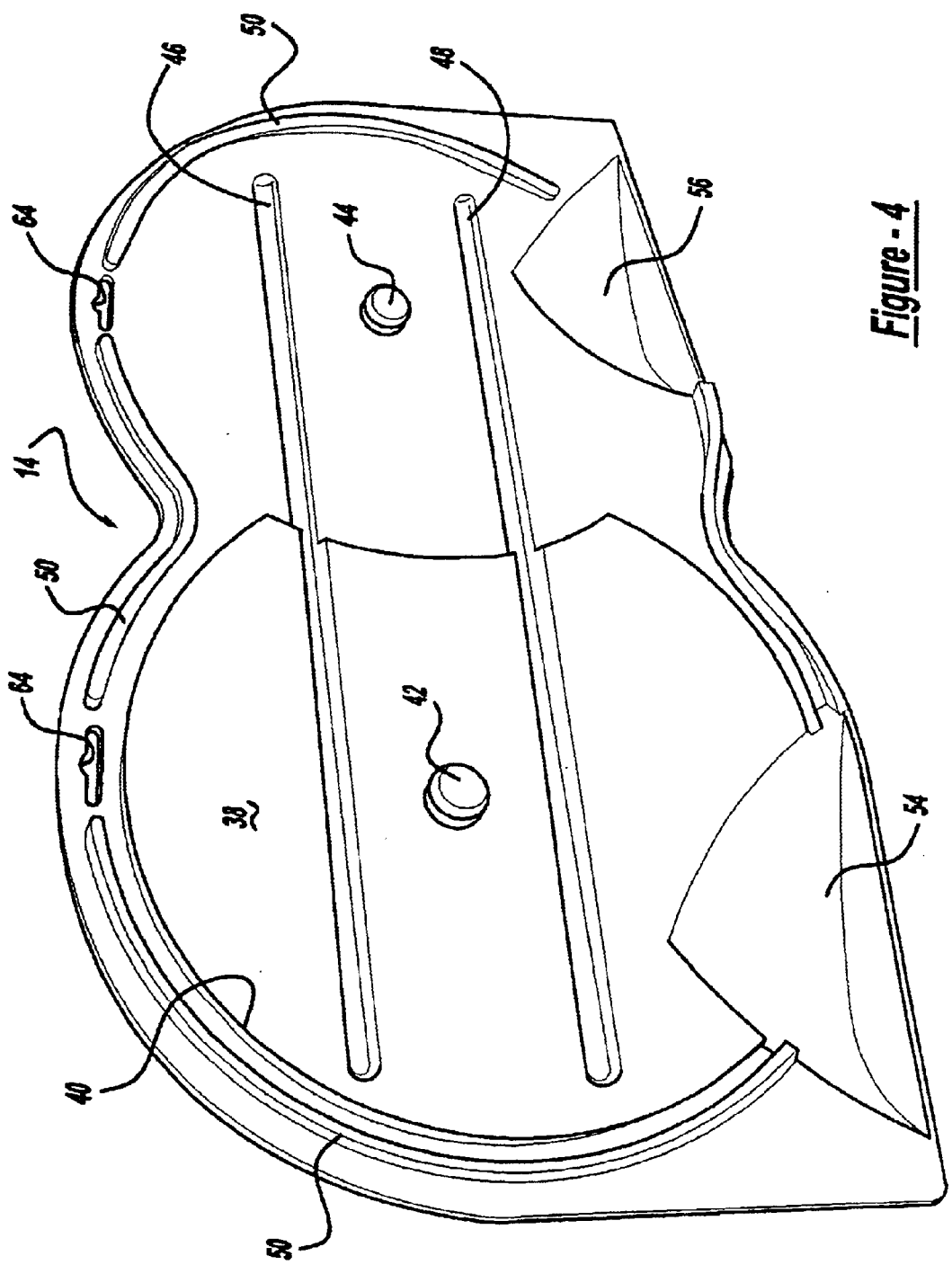
FIG. 4 is an inside perspective view of the back panel.
Figure 5:
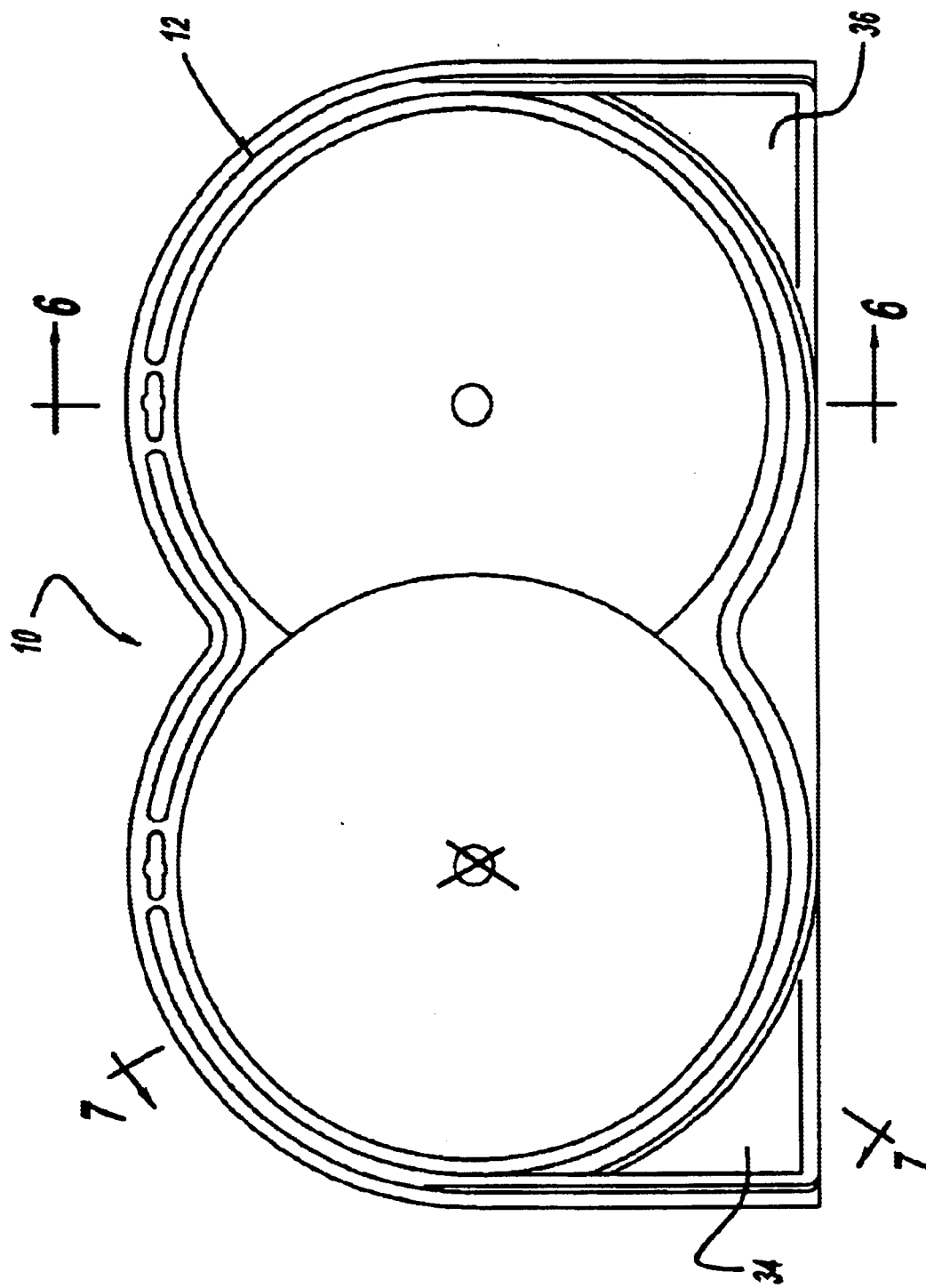
FIG. 5 is a plan view of the package of FIG. 1.
Figure 6:
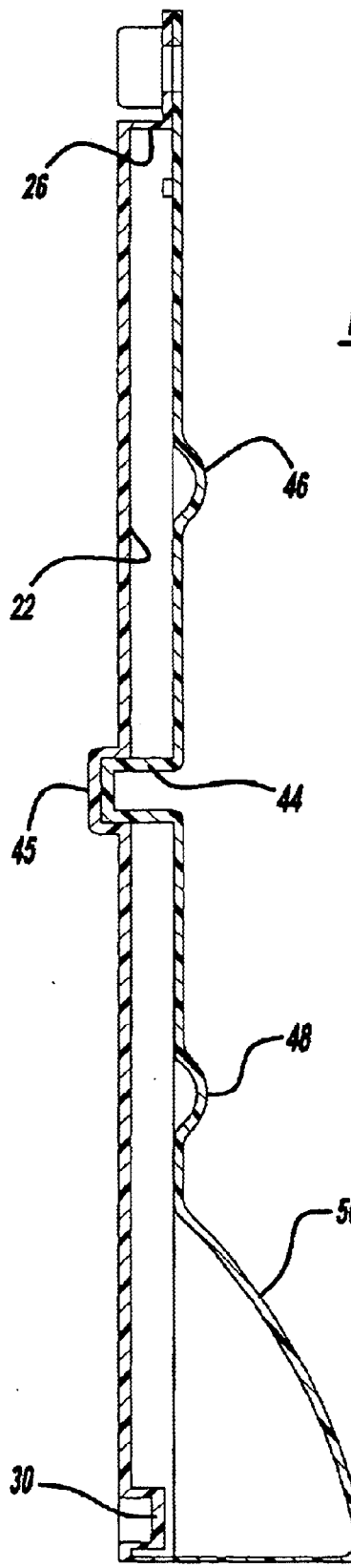
FIG. 6 is a cross section view of FIG. 5 along line 6—6 thereof.
Figure 7:
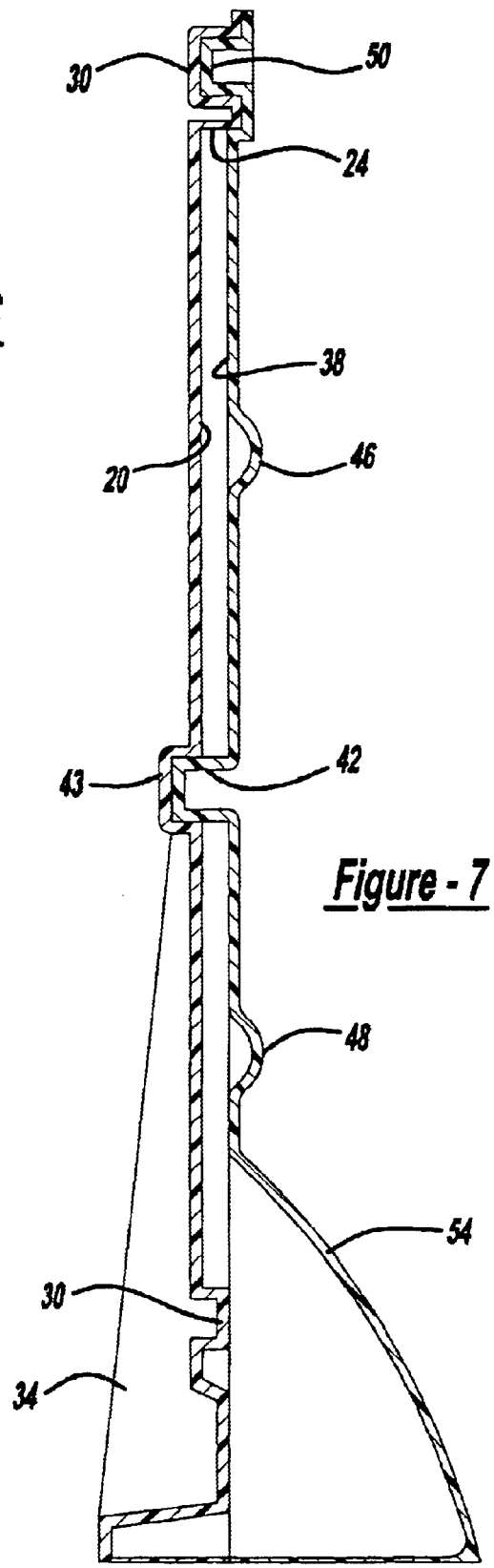
FIG. 7 is a cross section view of FIG. 5 along line 7—7 thereof.

Turning to FIGS. 8 and 9, an additional embodiment is shown. FIGS. 8 and 9 are like FIGS. 3 and 4, however an additional saw receiving portion is shown.

The panels 12' and 14' are like those previously discussed. The panels 12' and 14' includes an additional receiving portion 82 and 84. The saw blades are fit on top of one another in an overlapping fashion like that described. The back panel 14' includes a single stiffening rib. Further, additional saw blade receiving portions could be added to the panels.

While the above detailed description provides the preferred embodiment of the invention, it should be understood that the invention is susceptible to change, modification, alteration without deviating from the scope and spirit of the invention.

What is claimed is:

1. Packaging for a saw blade comprising:
   a first panel, said first panel including at least two circular portions adapted for receiving saw blades, said circular portions overlapping one another such that length of the at least two circular portions is less than a length of the combined diameters of the at least two circular portions and said at least two circular portions being offset with respect to one another such that the saw blades in said circular portions are adapted to contact one another;
   a first securement member on said first panel;
   a second panel, said second panel including a second securement member for coupling with said first securement member for holding said panels together such that the blades are adapted to be sandwiched between the panels; and
   at least one foot associated with one of said panels, said foot extending a desired distance from said one of said panels for enabling said saw blade packaging to be self-standing with respect to a surface.

2. The packaging according to claim 1 wherein a pair of feet are coupled with said panels.

3. The packaging according to claim 2 wherein each foot is unitarily formed with both panels.

4. The packaging according to claim 1 wherein said second panel includes a pair of arbor members adapted for receiving an arbor hole of the saw blade.

5. The packaging according to claim 4 wherein said first panel includes a pair of members coupling with said second panel arbor members.

6. The packaging according to claim 1 wherein said securement members on said first panel having an arcuate shape and peripherally spaced with respect to said circular saw receiving portions.

7. The packaging according to claim 1 wherein said securement members on said second panel having an arcuate shape and peripherally spaced with respect to said receiving portions.

8. The packaging according to claim 1 wherein said second panel includes a circular portion for providing a base for the offset saw blade.

9. The packaging according to claim 1 wherein said panels being transparent.

10. The packaging according to claim 1 wherein said securement members are adhered to one another.

11. The packaging according to claim 1 wherein said second panel including at least one stiffening rib.

* * * * *